United States Patent [19]

Moon et al.

[11] Patent Number: 4,861,605

[45] Date of Patent: Aug. 29, 1989

[54] PROCESS OF PREPARING INSTANT POWDERED FOOD

[75] Inventors: Juhn W. Moon; Bun Hwang; Jin K. Chang, all of Seoul, Rep. of Korea

[73] Assignee: Dongsuh Foods Corp., Rep. of Korea

[21] Appl. No.: 88,162

[22] Filed: Aug. 21, 1987

[30] Foreign Application Priority Data

Aug. 23, 1986 [KR] Rep. of Korea ............... 1986-6986

[51] Int. Cl.$^4$ ............................................. A23D 5/00
[52] U.S. Cl. ................................. 426/96; 426/443; 426/601; 426/658
[58] Field of Search ............... 426/601, 658, 443, 444, 426/516, 96, 655

[56] References Cited

U.S. PATENT DOCUMENTS

| | | |
|---|---|---|
| 2,771,364 | 11/1956 | Chase et al. ............... 426/470 |
| 2,788,276 | 4/1957 | Reich et al. ............... 426/470 |
| 3,788,860 | 1/1974 | Mahlmann ............... 426/433 |
| 3,790,689 | 2/1974 | Pitchon et al. ............... 426/434 |
| 3,798,342 | 3/1974 | Huste ............... 426/471 |
| 3,965,269 | 6/1976 | Lee et al. ............... 426/387 |
| 4,404,228 | 9/1983 | Cloosterman et al. ......... 426/601 X |

*Primary Examiner*—Donald E. Czaja
*Assistant Examiner*—Celine T. Callahan
*Attorney, Agent, or Firm*—Darby & Darby

[57] ABSTRACT

Process of preparing instant powdered food by mixing a melted hydrogenated vegetable oil, an emulsifier and a vegetable protein powder with a supersaturated crystalline carbohydrate solution; adding a crystalline carbohydrate to it; solidifying, cooling and reducing the resultant mixture to a powder. Process of preparing instant powdered food according to this invention is simple, cost-efficient and can also preserve the nutritional value and taste of the food.

4 Claims, No Drawings

PROCESS OF PREPARING INSTANT POWDERED FOOD

BACKGROUND OF THE INVENTION

The present invention relates to a process for the production of instant powdered food, comprising mainly a crystalline carbohydrate, a hydrogenated vegetable oil and a vegetable protein powder with a small amount of an emulsifier and a buffering agent added.

According to the conventional process, instant powdered foods containing oil and fat have been made by dissolving the powdered raw materials and the oil and fat in a certain amount of water and then dehydrating the resultant solution by means of a drum drier or a spray drier.

The conventional method, however, has disadvantages because it requires some complicated steps and also consumes a large amount of energy in the course of the dehydration processing. Moreover, the high temperature required by the conventional method for dissolution and dehydration result in a loss of nutrients and flavours from the original raw materials; this lowers the quality of the final product.

SUMMARY OF THE INVENTION

The object of the present invention is to eliminate such defects in the conventional process for preparing instant powdered foods containing oil and fat. This invention can simplify the process for preparing instant powdered foods while saving energy and preserving the nutritional value and taste of the food. Another object of the present invention is to make an instant powdered food product which is easily soluble in water for the consumers' instant use, and which has an extended shelf-life.

According to this invention, 70%–90% by weigh of a melted hydrogenated vegetable oil, 0.5%–5% by weight of an emulsifier and 5%–30% by weight of a vegetable protein powder are mixed to make a solution. Separately, a supersaturated crystalline carbohydrate is dissolved, depending on the carbohydrate solution, in 5%–20% by weight of water. The former solution is then mixed in 20%–70% by weight of the carbohydrate solution based on the weight of the former. 1%–5% by weight of a crystalline carbohydrate based on the weight of the mixture is added to this resultant mixture as a crystallizing seed in order to facilitate the crystallization of the supersaturated crystalline carbohydrate in the mixture. With such crystallization, the mixture turns into a semi-solidified state. The semi-solidified mixture is passed through an extruder with a cooling means to completely solidify it.

The product, having a diameter from 0.3 cm to 3.0 cm, is then pulberized and sieved to obtain the final product, a uniform-sized powder.

The cooling means in the extruder could conveniently be a chamber which circulates air cooled to between −20° C. and 10° C. or a metal plate which has been cooled to between −20° C. and 10° C.

DESCRIPTION OF THE PREFERRED EMBODIMENTS

Now, the process according to this invention shall be described indetail herein below. The crystalline carbohydrate such as a sugar, which is the main ingredient of the product, is dissolved completely in water, at a high temperature (120° C.–200° C.), to obtain a supersaturated solution. A hydrogenated vegetable oil such as a coconut oil or a palm oil, is heated above its melting point until it has completely melted. The melted hydrogenated vegetable oil is mixed with an emulsifier such as a glycerol mono-stearate and heated again to completely dissolve the agent. When a vegetable protein powder such as sodium caseinate is added to and mixed with the solution of the hydrogenated vegetable oil, the lipophilic component of the protein powder combines very easily with the oil and fat therein to form a mixture. An adequate amount of a buffering agent such as a mixture of a sodium carbonate and phosphate may be added to said mixture in order to give acid-resisting qualities and to add nutriment to the final product. The oil and fat mixture thus obtained is again mixed with said supersaturated crystalline carbohydrate solution to make a well mixed solution of the oil and fat, carbohydrate and protein. A small amount of a crystalline carbohydrate such as a sugar is fed, as a crystallizing seed, to the mixture of the oil and fat, carbohydrate and protein at the ratio of 1–5 wt.% for expediting crystallization of said mixture, transforming said mixture into a semi-solid state. Said crystallizing mixture is then passed through an extruder and a product in the size of 1–3 cm in diameter is obtained. The product is cooled through contact with air or a metal plate at a temperature of −20° C. to 10° C. so that it changes into a semi-solid state through crystallization of the crystalline carbohydrate and solidification of the hydrogenated vegetable oil. The resulting product in solid state is reduced to a powder by means of a pulverizer and then sieved by means of a 70 mesh screen to obtain the final product.

EXAMPLE

A sugar in the amount of 500 g was gradually added to 50 g of water and heated to 160° C. while being stirred continuously. This resulted in a transparent and supersaturated solution. In another vessel, 30 g of glycerol mono-stearate having both hydrophilic and lipophilic properties was added to 800 g of a coconut oil, which had been dissolved by heating it above its 40° C. melting point, to obtain an emulsified oil and fat solution. The melted oil and fat solution was mixed with 10 g of a mixture of sodium carbonate and phosphate as a buffering agent and 200 g of a powdered sodium caseinate. This mixture was added to the above-said supersaturated solution of the sugar with a stirring action and then combined with 50 g of the sugar as a crystallizing seed. The mixture of the supersaturated solution and the sugar began to crystallize and became a semi-solid mixture. The semi-solid mixture was put through an extruder, formed to have a uniform size of 1 cm in diameter, and placed in contact with the surface of a metal plate at 0° C. in order to crystallize the sugar and solidify the coconut oil into a solid state of a uniform shape. The resulting product was reduced to a powder in a pulverizer and sieved to produce the final product.

The present invention, which provides a process for producing instant powdered food with a vegetable protein by taking advantage of the crystallizing nature of the crystalline carbohydrate and the solidifying nature of the hydrogenated vegetable oil, has achieved a simple, effective and energy efficient process of production by eliminating the dehydration step from the conventional process. The elimination of the high temperature dehydration step preserves the nutrients and the natural flavors of the ingredients, and thus results in a higher quality product. The addition of some spices makes the present product very useful in preparing various instant foods to suit the consumers' taste.

In addition, powdered foods made by this process dissolve easily in water. For example, about 20 g of the powder made by the above example was easily dissolved in 180 ml of water at 80° C. to 100° C. The powder also has a long shelf-life for the convenience of consumers.

The present invention may also be used for the industrial production of other mixtures of carbohydrates, fat and protein.

What is claimed is:

1. A process for producing an instant powdered food extract consisting essentially of the steps of:

mixing 70% to 90% of a melted hydrogenated vegetable oil, 0.5% to 5% of an emulsifier and 5% to 30% of a vegetable protein powder with 20% to 70% of a supersaturated crystalline carbohydrate solution;

adding an amount of a crystalline carbohydrate effective to semi-solidify said mixture and thereby obtaining a semi-solidify mixture;

cooling said semi-solidified mixture at a temperature ranging between 20° C. to 10° C., and reducing said cooled-semi-solidified mixture to a powder, and recovering a powdered instant food extract.

2. The process of claim 1 wherein said supersaturated crystalline carbohydrate solution is made by mixing 80% to 95% of a super-saturated crystalline carbohydrate with 5% to 20% of water.

3. The process of claim 1 wherein 1% to 5% of said crystalline carbohydrate is added to said semi-solidified mixture.

4. The process of claim 3 wherein said powdered food extract has a size of about 70 mesh.

* * * * *